(12) United States Patent
Arai et al.

(10) Patent No.: US 12,394,919 B2
(45) Date of Patent: Aug. 19, 2025

(54) LAYERS OF CONDUCTORS AND INSULATORS FORMING A TERMINAL BLOCK

(71) Applicant: KAWASAKI JUKOGYO KABUSHIKI KAISHA, Kobe (JP)

(72) Inventors: Atsunori Arai, Kobe (JP); Tateki Sakimoto, Kobe (JP); Hayato Hirota, Kobe (JP); Tatsuya Okuwa, Kobe (JP); Hikaru Maesato, Kobe (JP); Sho Sakamoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 13 days.

(21) Appl. No.: 17/799,351

(22) PCT Filed: Feb. 18, 2021

(86) PCT No.: PCT/JP2021/006117
§ 371 (c)(1),
(2) Date: Aug. 12, 2022

(87) PCT Pub. No.: WO2021/167002
PCT Pub. Date: Aug. 26, 2021

(65) Prior Publication Data
US 2024/0235069 A1    Jul. 11, 2024

Related U.S. Application Data

(60) Provisional application No. 62/978,965, filed on Feb. 20, 2020.

(51) Int. Cl.
*H01R 9/24* (2006.01)
*F02C 7/266* (2006.01)

(52) U.S. Cl.
CPC ........... *H01R 9/2416* (2013.01); *F02C 7/266* (2013.01)

(58) Field of Classification Search
CPC ................... H01R 9/2416; H01R 9/18
See application file for complete search history.

(56) References Cited

U.S. PATENT DOCUMENTS 10,439,320 B2 * 10/2019 Goulds ............. H01R 9/223
2018/0254580 A1    9/2018 Goulds

FOREIGN PATENT DOCUMENTS

JP    2003-031280 A    1/2003
JP    2004-56924 A    2/2004
(Continued)

OTHER PUBLICATIONS

International Search Report of PCT/JP2021/006117 dated Apr. 27, 2021 [PCT/ISA/210].

*Primary Examiner* — Vanessa Girardi
(74) *Attorney, Agent, or Firm* — Sughrue Mion, PLLC

(57) ABSTRACT

A terminal block of a gas turbine engine includes: at least one electric conductor on and with which terminals of electric wires of electric parts and an electric device are laminated in a first direction and are in contact; at least two insulators laminated so as to sandwich the terminals and the electric conductor in the first direction; a stopper opposed to a first-end insulator located at a first end side in the first direction among the at least two insulators; and a spring arranged between the stopper and a second-end insulator located at a second end side in the first direction among the at least two insulators, the spring pressing the terminals against the electric conductor in the first direction.

5 Claims, 4 Drawing Sheets

(56) References Cited

FOREIGN PATENT DOCUMENTS

JP       2009-004191 A     1/2009
WO     2016/203589 A1   12/2016

\* cited by examiner

LAYERS OF CONDUCTORS AND INSULATORS FORMING A TERMINAL BLOCK

CROSS REFERENCE TO RELATED APPLICATIONS

This application is a National Stage of International Application No. PCT/JP2021/006117, filed Feb. 18, 2021, claiming priority to U.S. Provisional Patent Application No. 62/978,965, filed Feb. 20, 2020, the entire contents of which are incorporated herein by reference.

TECHNICAL FIELD

The present disclosure relates to a terminal block used for wires extending from electric parts located inside a casing of a gas turbine engine to electric devices located outside the casing.

BACKGROUND ART

A gas turbine engine in which a compressor, a combustor, and a turbine are arranged along a rotating shaft has been known.

CITATION LIST

Patent Literature

PTL 1: Japanese Laid-Open Patent Application Publication No. 2003-31280

SUMMARY OF INVENTION

Technical Problem

In the gas turbine engine, wires need to be arranged within a limited mounting space. A compact and low-cost terminal block which collects wires of sensors and devices arranged in a high-temperature region in a casing of the engine and enables the wires to extend to an outside of the casing is required.

Solution to Problem

A terminal block of a gas turbine engine according to one aspect of the present disclosure is a terminal block used for wires extending from electric parts located inside a casing of the gas turbine engine to an electric device located outside the casing. The terminal block includes: at least one electric conductor on and with which terminals of electric wires of the electric parts and the electric device are laminated in a first direction and are in contact: at least two insulators laminated so as to sandwich the terminals and the electric conductor in the first direction: a stopper opposed to a first-end insulator located at a first end side in the first direction among the at least two insulators; and a spring arranged between the stopper and a second-end insulator located at a second end side in the first direction among the at least two insulators, the spring pressing the terminals against the electric conductor in the first direction.

According to the above configuration, the terminal block used for the wires extending from the electric parts located inside the casing of the gas turbine engine to the electric device located outside the casing can be made compact and simple.

Advantageous Effects of Invention

According to one aspect of the present disclosure, the terminal block used for the wires extending from the electric parts located inside the casing of the gas turbine engine to the electric device located outside the casing can be made compact and simple.

DESCRIPTION OF EMBODIMENTS

Hereinafter, an embodiment will be described with reference to the drawings.

Figure 1:
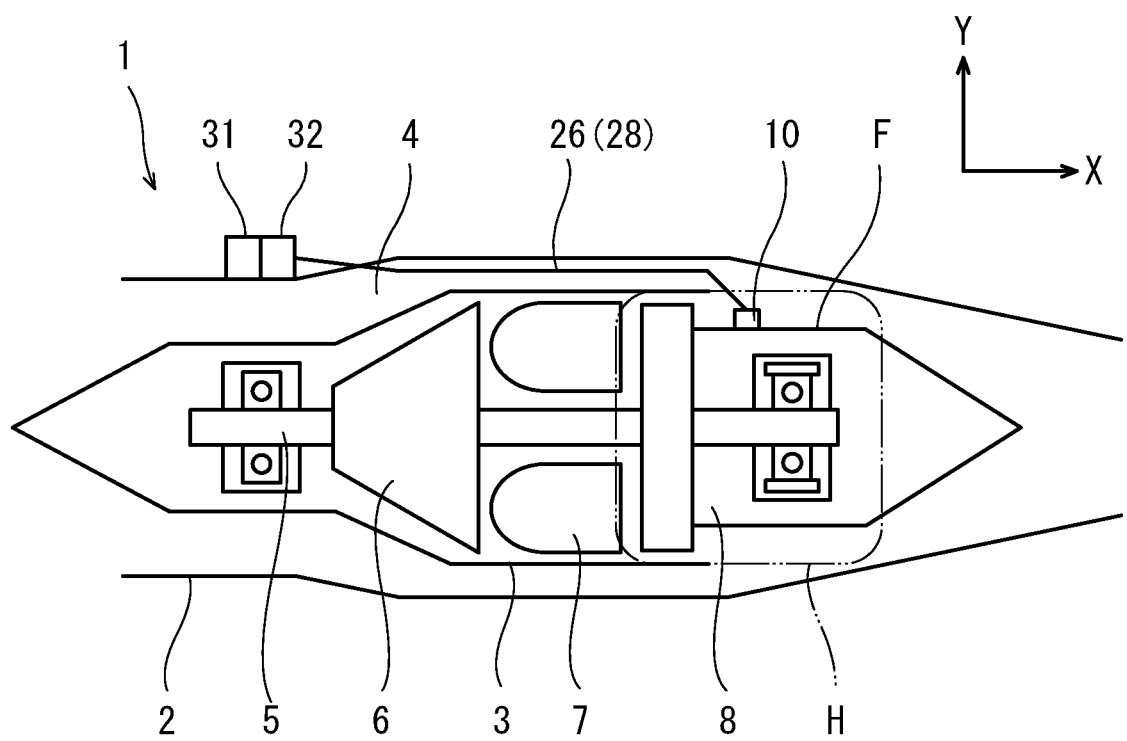
FIG. 1 is a sectional view of a gas turbine engine according to an embodiment.

FIG. 1 is a sectional view of a gas turbine engine 1 according to the embodiment. As shown in FIG. 1, the gas turbine engine 1 includes a compressor 6, a combustor 7, and a turbine 8 which are arranged along a rotating shaft 5. Air compressed by the compressor 6 is combusted by the combustor 7, and its combustion gas rotates the turbine 8. Thus, the rotating shaft 5 is driven. A direction in which an axis of the rotating shaft 5 extends is referred to as an axial direction X, and a direction orthogonal to the axial direction X is referred to as a radial direction Y.

The compressor 6, the combustor 7, and the turbine 8 are covered with an outer shell 3. A casing 2 is located outside the outer shell 3 in the radial direction Y. A bypass passage 4 is located between the casing 2 and the outer shell 3. A controller 31 (first electric device) and a power supply 32 (second electric device) are arranged outside the casing 2. A region located at an inner side of the casing 2 in the radial direction Y and a downstream side of the combustor 5 is a high-temperature region H having a temperature higher than 650° C. A terminal block 10 is arranged in the high-temperature region H.

The terminal block 10 is fixed to a frame F that is located downstream of the combustor 7 in the casing 2 and disposed outside the turbine 8 in the radial direction Y. For example, the terminal block 10 is arranged inside the casing 2 in the radial direction Y and outside the frame F in the radial direction Y. For example, when a reverse flow combustor is adopted as the combustor 7 of the gas turbine engine 1, the terminal block 10 may be disposed at a portion of the outer shell 3 which portion is located downstream of the combustor 7 in the axial direction X of the gas turbine engine 1 and outside the turbine 8 in the radial direction Y.

Figure 2:
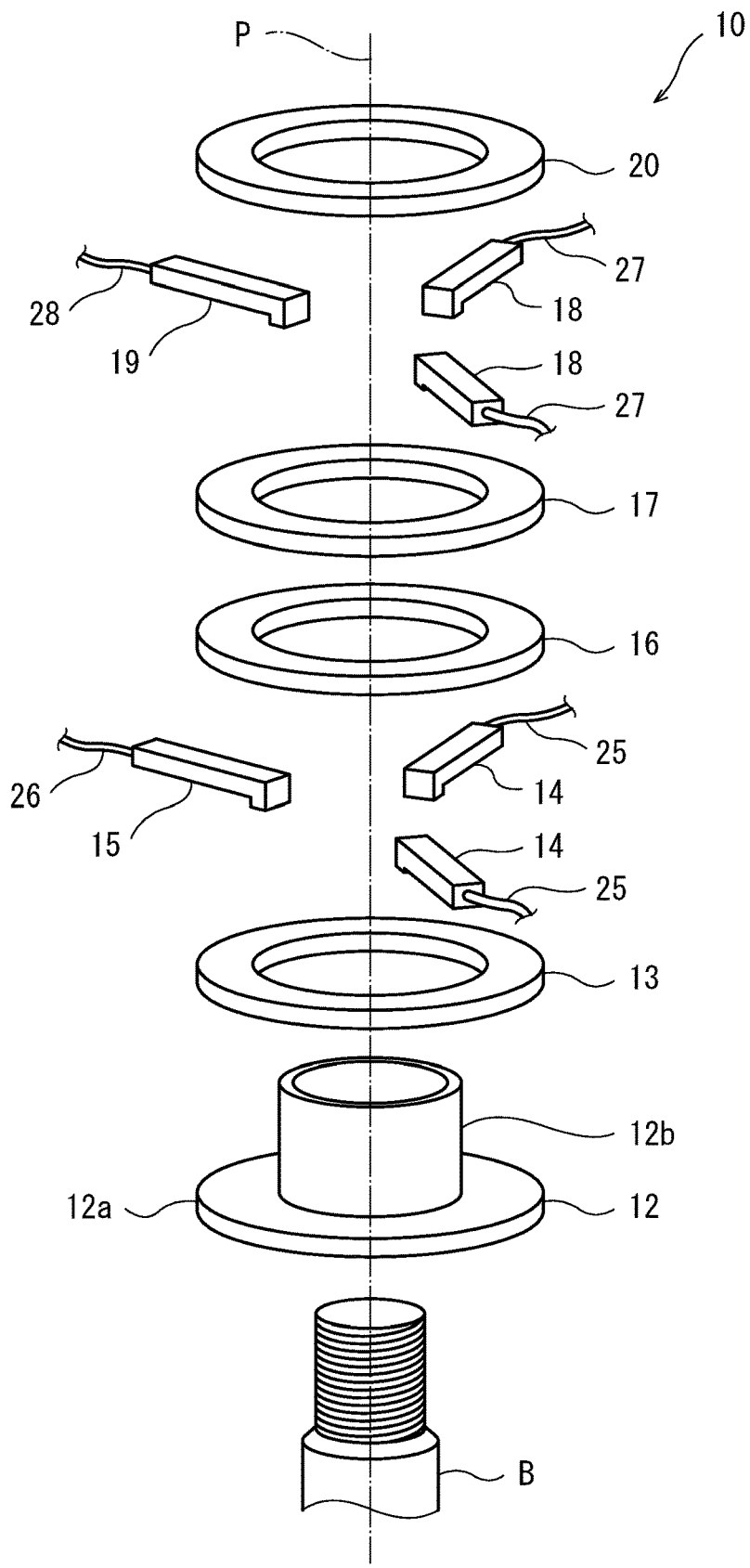
FIG. 2 is an exploded perspective partial view of a terminal block of FIG. 1.
Figure 3:
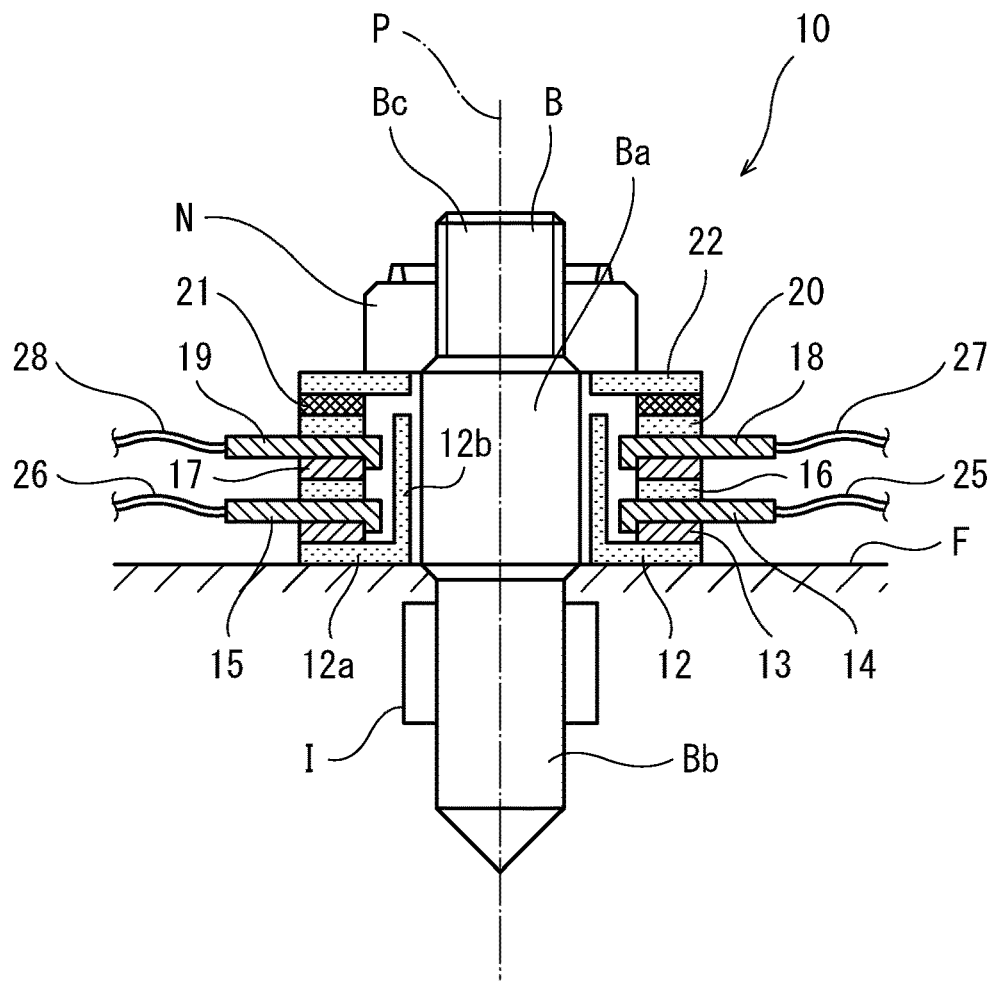
FIG. 3 is a sectional view of the terminal block of FIG. 2.
Figure 4:
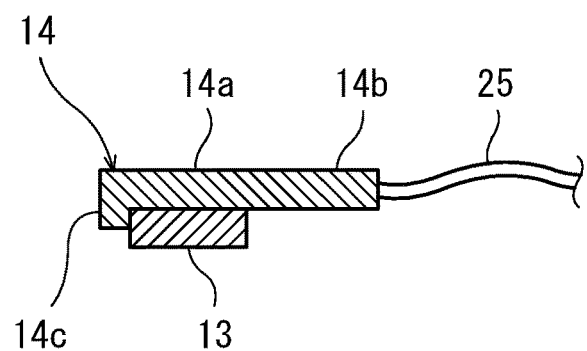
FIG. 4 is an enlarged view of a terminal and an electrically-conductive ring in the terminal block of FIG. 3.
Figure 5:
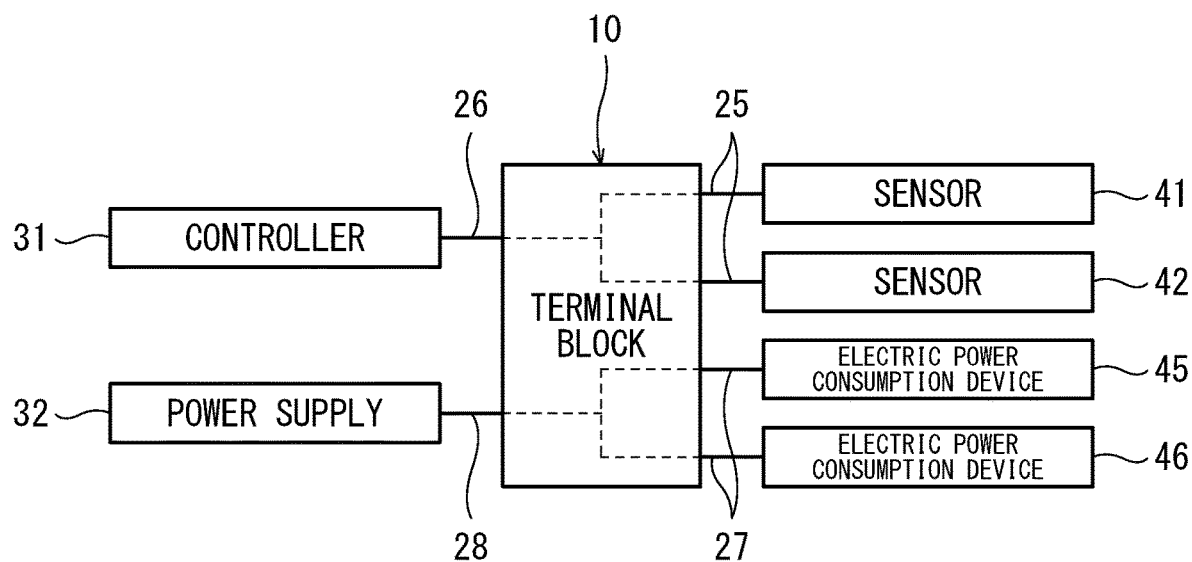
FIG. 5 is a block diagram for explaining an electrical connection of the terminal block of FIG. 3.

FIG. 2 is an exploded perspective partial view of the terminal block 10 of FIG. 1. FIG. 3 is a sectional view of the terminal block 10 of FIG. 2. FIG. 4 is an enlarged view of a terminal and an electrically-conductive ring in the terminal block 10 of FIG. 3. FIG. 5 is a block diagram for explaining an electrical connection of the terminal block 10 of FIG. 3. As shown in FIGS. 2 to 5, the terminal block 10 includes a stud bolt B, an insulator 12, an electrically-conductive ring 13 (electric conductor), terminals 14 and 15, an insulating ring 16 (insulator), an electrically-conductive ring 17 (electric conductor), terminals 18 and 19, an insulating ring 20 (insulator), a spring washer 21, an insulating ring 22, and a nut N (stopper).

The stud bolt B includes an intermediate shaft portion Ba, a root threaded portion Bb. and a tip threaded portion Bc. The root threaded portion Bb projects toward one side of the intermediate shaft portion Ba in an axial direction P of the stud bolt B. The tip threaded portion Bc projects toward the other side of the intermediate shaft portion Ba in the axial direction P. The intermediate shaft portion Ba is larger in diameter than the tip threaded portion Bc. The stud bolt B is fixed to the frame F in such a manner that the root threaded portion Bb is threadedly engaged with an insert screw I embedded in the frame F. The stud bolt B projects outward in the radial direction Y from the frame F. The stud bolt B is made of, for example, metal (for example, superalloy mainly containing a Fe group, a Ni group, or a Co group) having heat resistance and electrical conductivity. In the present embodiment, the axial direction P (first direction) of the stud bolt B extends in the radial direction Y of the gas turbine engine 1 but may extend in another direction.

The insulator 12 is made of an insulating material. The insulator 12 is made of, for example, ceramic having an insulation property and heat resistance. The insulator 12 includes an insulating ring portion 12*a* (second-end insulator) and an insulating tube portion 12*b*. The insulating tube portion 12*b* projects from an inner peripheral end of the insulating ring portion 12*a* in a direction perpendicular to the insulating ring portion 12*a*. The insulating ring portion 12*a* has an annular plate shape. The insulating ring portion 12*a* is supported by the frame F. The insulating ring portion 12*a* and the insulating tube portion 12*b* are externally fitted to the stud bolt B with play: The tube portion 12*b* extends in the axial direction P of the stud bolt B. The tube portion 12*b* isolates the stud bolt B from the electrically-conductive rings 13 and 17 and the terminals 14, 15, 18, and 19.

The electrically-conductive ring 13 is an annular plate made of an electrically-conductive material. The electrically-conductive ring 13 is placed on the insulating ring portion 12*a* in the axial direction P. The electrically-conductive ring 13 is made of, for example, metal (for example, superalloy mainly containing a Fe group, a Ni group, or a Co group) having heat resistance and electrical conductivity. The electrically-conductive ring 13 is externally fitted to the insulating tube portion 12*b* with play. To be specific, an inner diameter of the electrically-conductive ring 13 is larger than an outer diameter of the insulating tube portion 12*b*. An outer diameter of the electrically-conductive ring 13 is equal to or smaller than an outer diameter of the insulating ring portion 12*a*.

The terminals 14 are connected to respective sensors 41 and 42 (first electric parts), arranged in the casing 2, through respective electric wires 25. One example of the sensor 41 is a temperature sensor. The terminal 14 is made of an electrically-conductive material. The terminal 15 is made of, for example, metal (for example, superalloy mainly containing a Fe group, a Ni group, or a Co group) having heat resistance and electrical conductivity. The terminals 14 are placed on the electrically-conductive ring 13 in the axial direction P.

Each of the terminals 14 includes a placing portion 14*a*, an electric wire connecting portion 14*b*, and a retaining portion 14*c*. The placing portion 14*a* is in contact with a surface of the electrically-conductive ring 13 which surface faces in the axial direction P. The electric wire connecting portion 14*b* is located at an end of the placing portion 14*a*, and the electric wire 25 is connected to the electric wire connecting portion 14*b*. The retaining portion 14*c* projects in a hook shape from an end of the placing portion 14*a* which end is opposite to the electric wire connecting portion 14*b*. To be specific, entirety of the placing portion 14*a* and the retaining portion 14*c* has an L shape.

The terminal 15 is connected to the controller 31, arranged outside the casing 2, through an electric wire 26. The terminal 15 is made of, for example, metal (for example, superalloy mainly containing a Fe group, a Ni group, or a Co group) having heat resistance and electrical conductivity. The terminal 15 is placed on the electrically-conductive ring 13 in the axial direction P. The number of terminals 15 is smaller than the number of terminals 14. To be specific, the number of electric wires 26 is smaller than the number of electric wires 25. Since the shape of the terminal 15 is substantially the same as the shape of the terminal 14, an explanation thereof is omitted.

The insulating ring 16 is an annular plate made of an insulating material. The insulating ring 16 is made of, for example, ceramic having an insulation property and heat resistance. The insulating ring 16 is placed on the terminals 14 and 15 in the axial direction P. The insulating ring 16 is externally fitted to the insulating tube portion 12*b* with play. To be specific, an inner diameter of the insulating ring 16 is larger than the outer diameter of the insulating tube portion 12*b*.

The electrically-conductive ring 17 is an annular plate made of an electrically-conductive material. The electrically-conductive ring 17 is placed on the insulating ring 16 in the axial direction P. The electrically-conductive ring 17 is located away from the electrically-conductive ring 13 in the axial direction P. The electrically-conductive ring 17 is made of, for example, metal (for example, superalloy mainly containing a Fe group, a Ni group, or a Co group) having heat resistance and electrical conductivity. The electrically-conductive ring 17 is externally fitted to the insulating tube portion 12*b* with play: To be specific, an inner diameter of the electrically-conductive ring 17 is larger than the outer diameter of the insulating tube portion 12*b*.

The terminals 18 are connected to respective electric power consumption devices 45 and 46 (second electric parts), arranged in the casing 2, through respective electric wires 27. One example of each of the electric power consumption devices 45 and 46 is an igniter. Each of the terminals 18 is made of, for example, metal (for example, superalloy mainly containing a Fe group, a Ni group, or a Co group) having heat resistance and electrical conductivity. The terminal 18 is placed on the electrically-conductive ring 17 in the axial direction X. Since the shape of the terminal 18 is substantially the same as the shape of the terminal 14, an explanation thereof is omitted.

A terminal 19 is connected to the power supply 32, arranged outside the casing 2, through an electric wire 28. The terminal 19 is made of, for example, metal (for example, superalloy mainly containing a Fe group, a Ni group, or a Co group) having heat resistance and electrical conductivity. The terminal 19 is placed on the electrically-conductive ring 17 in the axial direction P. The number of terminals 19 is smaller than the number of terminals 18. To be specific, the number of electric wires 28 is smaller than the number of electric wires 27. The terminals 18 and 19 are located away from the terminals 13 and 14 in the axial direction P. Since the shape of the terminal 19 is substantially the same as the shape of the terminal 14, an explanation thereof is omitted.

The insulating ring 20 is an annular plate made of an insulating material. The insulating ring 20 is made of, for example, ceramic having an insulation property and heat resistance. The insulating ring 20 is placed on the terminals 18 and 19 in the axial direction P. The insulating ring 20 is externally fitted to the insulating tube portion 12b with play. To be specific, an inner diameter of the insulating ring 20 is larger than the outer diameter of the insulating tube portion 12b.

The spring washer 21 is an annular disc spring. The spring washer 21 is placed on the insulating ring 20 in the axial direction P. The spring washer 21 has elasticity in the axial direction P. The spring washer 21 is externally fitted to the stud bolt B with play.

The insulating ring 22 is an annular plate made of an insulating material. The insulating ring 22 is made of, for example, ceramic having an insulation property and heat resistance. The insulating ring 22 is placed on the spring washer 21 in the axial direction P. The insulating ring 22 is externally fitted to the stud bolt B with play. An inner diameter of the insulating ring 22 is smaller than the outer diameter of the insulating tube portion 12b.

As described above, the insulating ring portion 12a, the electrically-conductive ring 13, the terminals 14 and 15, the insulating ring 16, the electrically-conductive ring 17, the terminals 18 and 19, the insulating ring 20, the spring washer 21, and the insulating ring 22 are laminated on each other in this order from the frame F to constitute a laminated body 30. The laminated body 30 is externally fitted to the intermediate shaft portion Ba of the stud bolt B with play. The terminals 14, 15, 18, and 19 project outward beyond a group of the electrically-conductive rings 13 and 17, the insulating rings 16, 20, and 22, and the spring washer 21 in a direction orthogonal to the axial direction P.

The nut N is threadedly engaged with the tip threaded portion Bc of the stud bolt B projecting from the laminated body 30 and is opposed to the insulating ring 22 (first-end insulator). The laminated body 30 is sandwiched between the frame F and the nut N. The nut N is made of, for example, metal (for example, superalloy mainly containing a Fe group, a Ni group, or a Co group) having heat resistance and electrical conductivity. The nut N is positioned at such a position as to press the insulating ring 22 against the spring washer 21 in the axial direction P. Specifically, the nut N is positioned at such a predetermined position that the spring washer 21 is bent but has still room for further elastic deformation. With this, based on a limit that is the elastic force of the spring washer 21, the terminals 14 and 15 are pressed by the electrically-conductive ring 13, and the terminals 18 and 19 are pressed by the electrically-conductive ring 17 in the axial direction P.

The stud bolt B is fixed to the frame F such that the nut N threadedly engaged with the tip threaded portion Bc is positioned at the predetermined position while being in contact with an end surface of the large-diameter intermediate shaft portion Ba in the axial direction P. To be specific, since the bottom of the nut N located at the tip threaded portion Bc reaches the end surface of the large-diameter intermediate shaft portion Ba in the axial direction P, a distance from the surface of the frame F to the nut N is fixed. With this, excessive axial force is prevented from being applied to the parts constituting the laminated body 30. Therefore, ceramic that has a low linear expansion coefficient and is fragile can be used for the insulating rings 12, 16, 20, and 22.

Each of the insulating rings 12a, 16, 20, and 22 is made of a material having an insulation property and heat resistance and functions even at a high temperature of more than 650° C. Moreover, the terminal block 10 has a simple laminated structure fastened by the stud bolt B and the nut N. Therefore, the terminal block 10 can be made low in cost and can be made compact. On this account, the terminal block 10 can be arranged in the high-temperature region H located downstream of the combustor 7 and the turbine 8.

The electric wires 26 and 28 pass through the bypass passage 4, extend to an outside of the casing 2, and are respectively connected to the controller 31 and the power supply 32. As above, the terminal block 10 is used for the wires extending from the sensors 41 and 42 and the electric power consumption devices 45 and 46 located inside the casing 2 to the controller 31 and the power supply 32 located outside the casing 2.

The present disclosure is not limited to the above-described embodiment, and modifications, additions, and eliminations may be made with respect to the configuration of the embodiment. For example, each of the insulating rings 12, 16, 20, and 22 may have an oval ring shape, a polygonal ring shape, or the like instead of a perfect-circle ring shape. Each of the insulating rings 12, 16, 20, and 22 may have another shape (such as a C shape or a circular-arc shape) instead of a ring shape.

As long as the spring washer 21 is interposed between the uppermost insulating ring 22 and the lowermost insulating ring portion 12a, the spring washer 21 may be interposed between other layers. The electrically-conductive rings 13 and 17 are two layers but may be one layer or three or more layers. The insulating rings 12a, 16, 20, and 22 are four layers but may be two layers or five or more layers. The insulating tube portion 12b may be opposed to at least the electrically-conductive rings 13 and 18 and the terminals 14, 15, 18, and 19 in the direction orthogonal to the axial direction P and does not have to be opposed to the insulating ring 20 and the spring washer 21.

The invention claimed is:

1. A terminal block of a gas turbine engine,
the terminal block being used for wires extending from electric parts located inside a casing of the gas turbine engine to an electric device located outside the casing, the terminal block comprising:
at least one electric conductor on and with which terminals of electric wires of the electric parts and the electric device are laminated in a first direction and are in contact;
at least two insulators laminated so as to sandwich the terminals and the electric conductor in the first direction;
a stopper opposed to a first-end insulator located at a first end side in the first direction among the at least two insulators; and
a spring arranged between the stopper and a second-end insulator located at a second end side in the first direction among the at least two insulators, the spring pressing the terminals against the electric conductor in the first direction,
wherein each of the terminals includes:
a placing portion that is in contact with a surface of the electric conductor which surface faces in the first direction;
an electric wire connecting portion to which the corresponding electric wire is connected; and
a retaining portion projecting in a hook shape from an end of the placing portion which end is opposite to the electric wire connecting portion.

2. The terminal block according to claim 1, wherein the insulators are made of ceramic.

3. The terminal block according to claim 1, wherein each of the electric conductor and the insulators has a ring shape.

4. The terminal block according to claim 3, further comprising a stud bolt fixed to a frame in the casing, wherein:
- the stud bolt is inserted through centers of the ring-shaped electric conductor and the ring-shaped insulators in the first direction; and
- the stopper is a nut that is threadedly engaged with the stud bolt.

5. The terminal block according to claim 4, wherein:
- the second-end insulator is supported by the frame; and
- the second-end insulator includes an insulating tube portion that extends in the first direction toward the first-end insulator so as to isolate the stud bolt from the electric conductor and the terminals.

* * * * *